(12) United States Patent
Fox

(10) Patent No.: US 6,437,741 B1
(45) Date of Patent: Aug. 20, 2002

(54) DETECTION OF EMISSIONS FROM COMMERCIAL ELECTRONIC DEVICES THAT INCLUDE AN AMPLITUDE MODULATION COMPONENT

(75) Inventor: Neil David Fox, Fairfax, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/756,674

(22) Filed: Jan. 10, 2001

(51) Int. Cl.[7] .................................................. G01S 5/02
(52) U.S. Cl. ...................................................... 342/417
(58) Field of Search .............................. 342/417, 147, 342/196

(56) References Cited

U.S. PATENT DOCUMENTS

| | | |
|---|---|---|
| 3,876,946 A | 4/1975 | La Clair et al. |
| 4,443,801 A | 4/1984 | Klose et al. |
| 4,626,859 A | 12/1986 | Stansfield |
| H292 H | 6/1987 | Klose et al. |
| 4,876,549 A | 10/1989 | Masheff |
| 5,056,051 A | 10/1991 | Tkalcevic |
| 5,477,230 A * | 12/1995 | Tsui .............................. 342/156 |
| 5,525,997 A | 6/1996 | Kwon |
| 6,043,770 A | 3/2000 | Garcia et al. |

* cited by examiner

*Primary Examiner*—Thomas H. Tarcza
*Assistant Examiner*—Fred H. Mull
(74) *Attorney, Agent, or Firm*—Rothwell, Figg, Ernst & Manbeck

(57) ABSTRACT

A direction finder apparatus and method are provided. The direction finder apparatus includes an antenna system, a RF front end, and an analog signal detector that detects an electromagnetic signal and provides in response a characteristic signal without an underlying carrier wave. The direction finder apparatus further includes an analog-to-digital (A/D) converter, a fast Fourier transform (FFT) processor that produces a plurality of component frequency approximations representing frequency components of the AM signal, a plurality of storage bins, and a post-processor. The post-processor determines a maximum S/N ratio from among the plurality of component frequency approximations. A direction of arrival (DOA) angle of the RF signal is determined when the antenna system is oriented to produce a maximum S/N ratio.

18 Claims, 5 Drawing Sheets

DETECTION OF EMISSIONS FROM COMMERCIAL ELECTRONIC DEVICES THAT INCLUDE AN AMPLITUDE MODULATION COMPONENT

BACKGROUND OF THE INVENTION

1. Field of the Invention

The present invention relates generally to a direction finder, and more particularly to a direction finder apparatus and method that detect a RF signal that includes an amplitude modulated signal component.

2. Description of the Background Art

Direction finding is the process of determining the origin of an electromagnetic signal. Direction finding therefore involves detecting the signal and then determining a direction of arrival (DOA) angle to the signal origin point. In order to accurately determine the origin of the broadcast, at least two independent directional readings must be obtained at different locations, referred to as triangulation.

Direction finding has many applications. One application is finding an intended transmission by pinpointing a broadcast origination location. Another common use is for finding a source of interference or noise. As the world becomes more populous and more technologically advanced, there are more and more electronic devices sharing the frequency spectrum. In addition, over time electronic devices deteriorate and may therefore leak noise.

The earliest direction finders were radio receivers, and direction finding consisted of finding a DOA heading by rotating the accompanying antenna (usually of a loop or dish design) until the strongest signal was found. Improvements in direction finder design initially focussed on improved reception and amplification. However, signal differentiation and identification has also been addressed. This is because as the use of the signal spectrum has increased, it has become increasingly costly and complicated to look at ever increasing portions of the signal spectrum. Direction finding was relatively easy when the maximum attainable frequency was below, say, 100 megahertz (MHz). Now, however, when seeking a signal in the gigahertz (GHz) range, a larger portion of the signal spectrum may have to be examined.

In order to refine direction finding and aid in identification of the signal, knowing the approximate characteristics (i.e., the signature) of the signal is helpful. By comparing an unknown signal to known signal signatures, the signal may be more easily identified.

The prior art has used Fourier transforms in order to aid in signal identification and direction finding. The Fourier transform may be used to convert an electromagnetic signal from the time domain to the frequency domain. This may be done to aid in detection and characterization of a subject signal.

FIG. 1 shows an amplitude modulated (AM) radio frequency (RF) electromagnetic signal in the time domain. The time domain signal contains information and is generally in the shape of a sinusoid. Many electronic devices broadcast RF electromagnetic signals, including devices that unintentionally generate and broadcast signals. These unintentional signals may be generated by motors, local oscillators, microwave oven magnetrons, etc. The signal frequency may occupy one or more frequencies, and may vary.

A microwave oven is a good example of an unintended RF signal source. In a microwave oven, the oven generates RF waves that heat food. The RF waves are referred to as microwaves due to their small wavelength. The microwave oven includes a magnetron that generates RF waves of a microwave frequency, generally in the 2,430–2,505 MHZ frequency range (the s-band). The magnetron is triggered by A/C line current cycles, typically 60 hertz (Hz), plus or minus about 20 Hz. The polarity of the magnetron is reversed every time the line current changes. Therefore, a microwave oven magnetron generates a RF pulse train having a substantially regular amplitude modulated waveform of about 60 Hz. As a result, the magnetron produces an unintended amplitude modulated RF signal having a carrier wave of the microwave frequency.

A Fourier transform of the signal of FIG. 1 results in a waveform having a shape corresponding to the presence of sinusoidal frequency components. Complex waveforms may be transformed by the Fourier transformation into sums of simple, sinusoidal functions at different frequencies. Therefore, to determine the response of a certain system to a complex input signal, the input signal may be broken down into a sum of sinusoidal elements and the system response to each sinusoidal element may be analyzed. This technique is referred to as analysis in the frequency domain and is probably the most widely known and used design and analysis procedure for all types of electrical engineering problems. In general, the Fourier transform is used to move a function from amplitude as a function of time to amplitude as a function of frequency. Looking at a function which describes amplitude in terms of frequency reveals the signal strength in a particular range of frequencies.

A Fourier transform of a pure sinusoid carrier wave would therefore result in essentially an impulse or spike, as there would be no harmonics in the signal. However, when looking for an interfering signal, the bandwidth of a search may be very large and therefore complicated and costly to detect. Moreover, if the signal's frequency and bandwidth are not known, the direction finder apparatus may have to search a larger than necessary frequency range. In the time domain, a direction finder apparatus would have to apply a filter or bank of filters and measure the filter output(s) in order to detect a signal. This may require a large number of filters in order to cover a desired frequency detection range.

FIG. 2 is a frequency domain representation of a 2.45 GHz signal. In the frequency domain, a detection finder apparatus may more easily detect a signal.

FIG. 3 is a frequency domain representation of a 2.45 GHz signal, showing various possible frequency components (i.e., harmonics). Although the signal contains multiple frequency harmonics, for direction finding the search bandwidth need only extend far enough to detect the main frequency component of the signal (i.e., the main peak). However, it should be noted that this prior art search bandwidth is still quite large. For example, to detect a common microwave oven emission in the 2,430–2,505 MHZ range, the RF search bandwidth would be 2,505–2,430=75 MHZ.

There remains a need, therefore, for improvements in direction finding.

SUMMARY OF THE INVENTION

A direction finder apparatus for determining a direction to a device generating a RF signal that includes an amplitude modulated component is provided according to a first embodiment of the invention. The direction finder apparatus comprises an antenna system capable of receiving the signal and a RF front end communicating with the antenna system, the RF front end including at least one filter stage and at least one amplifier stage. The direction finder apparatus further comprises an analog signal detector communicating with the RF front end, the analog signal detector detecting the electromagnetic signal and providing in response a characteristic signal without an underlying carrier wave. The direction finder apparatus further comprises an analog-to-digital (A/D) converter that communicates with the analog signal detector and digitizes the characteristic signal, and a fast Fourier transform (FFT) processor that communicates with the A/D converter. The FFT processor performs a Fourier transform on the digitized signal over a predetermined sampling period. The FFT processor produces a plurality of component frequency approximations representing frequency components of the AM signal. The direction finder apparatus further comprises a plurality of storage bins that communicate with the FFT processor, with the plurality of storage bins storing the plurality of component frequency approximations. The direction finder apparatus further comprises a post-processor that communicates with the plurality of storage bins. The post-processor determines a maximum S/N ratio from among the plurality of component frequency approximations. A DOA angle of the RF signal is determined when the antenna system is oriented to produce a maximum S/N ratio.

A direction finder apparatus for determining a direction to a device generating a RF signal that includes an amplitude modulated component is provided according to a second embodiment of the invention. The direction finder apparatus comprises an antenna means for receiving the RF signal, at least one filtering means for filtering the RF signal, and at least one amplifying means for amplifying the RF signal. The direction finder apparatus further comprises an analog signal detector means for detecting the electromagnetic signal and providing in response a characteristic signal without an underlying carrier wave. The direction finder apparatus further comprises an analog-to-digital (A/D) converter means for digitizing the characteristic signal and a fast Fourier transform (FFT) processing means for performing a Fourier transform on the digitized signal over a predetermined sampling period and producing a plurality of component frequency approximations representing frequency components of the AM signal. The direction finder apparatus further comprises a storage means for storing the plurality of component frequency approximations and a post-processing means for determining a maximum S/N ratio from among the plurality of component frequency approximations. A DOA angle of the RF signal is determined when the antenna means is oriented to produce a maximum S/N ratio.

A method of finding a direction to a RF signal that includes an amplitude modulated signal component is provided according to the invention. The method comprises the steps of detecting the RF signal, detecting the amplitude modulated component, and digitizing the amplitude modulated component. The method further comprises the steps of performing a Fourier transform on the digitized amplitude modulated component to produce a FFT output and determining a direction of arrival angle from a maximum FFT output.

The above and other features and advantages of the present invention will be further understood from the following description of the preferred embodiments thereof, taken in conjunction with the accompanying drawings.

DESCRIPTION OF THE PREFERRED EMBODIMENTS

Figure 1:
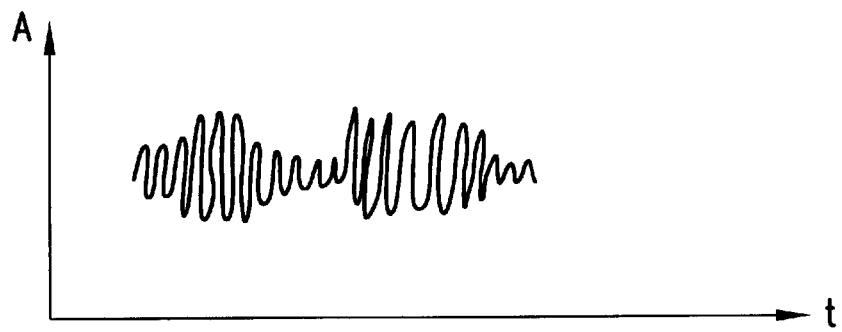
FIG. 1 shows an amplitude modulated (AM) radio frequency (RF) electromagnetic signal in the time domain.
Figure 2:
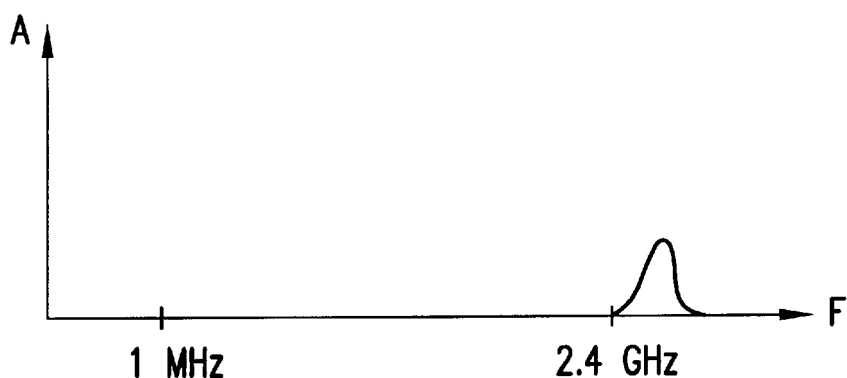
FIG. 2 is a frequency domain representation of a 2.45 GHz signal.
Figure 3:
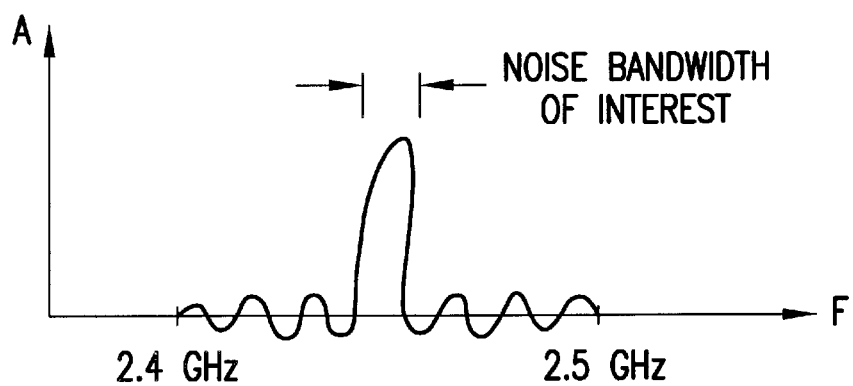
FIG. 3 is a frequency domain representation of a 2.45 GHz signal, showing various possible frequency components.
Figure 4:
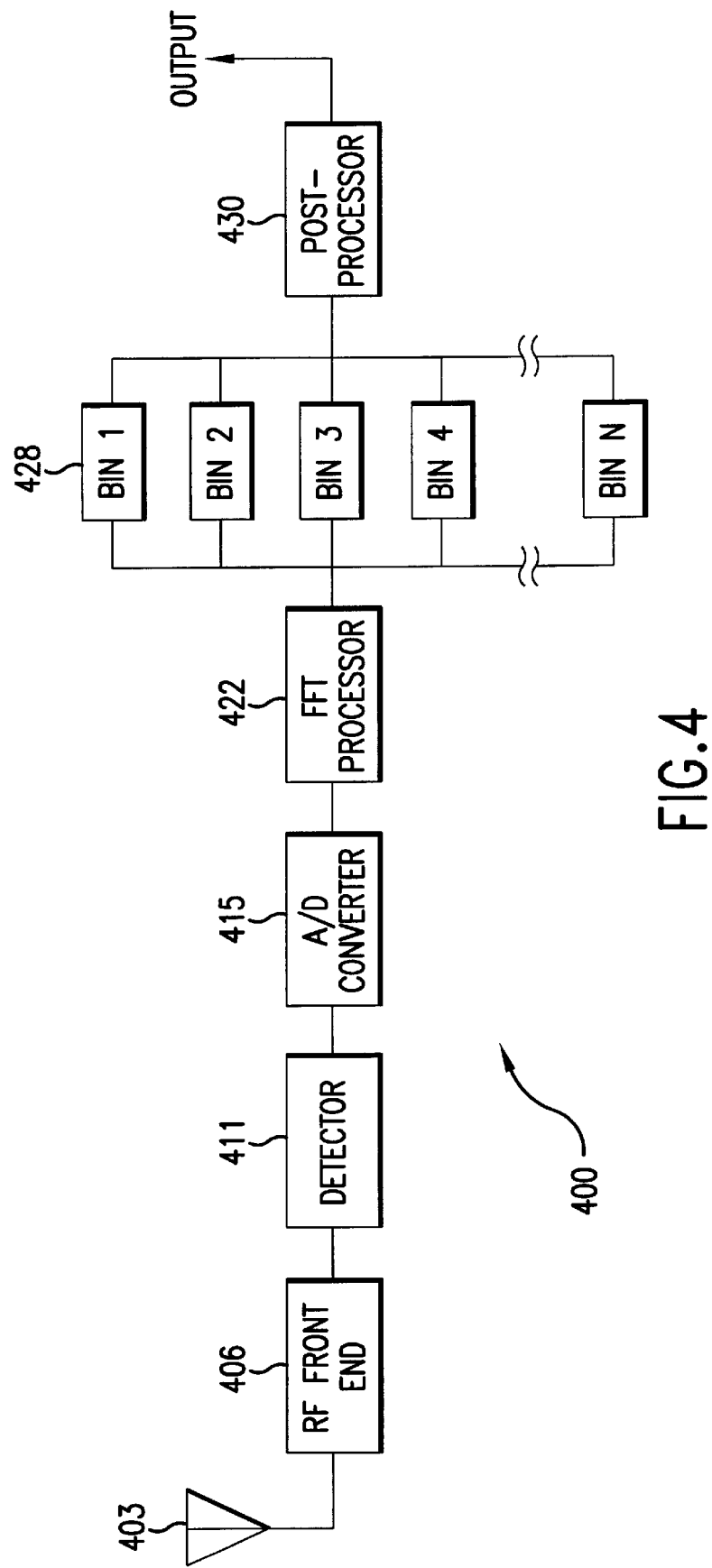
FIG. 4 is a block diagram of a direction finder apparatus according to the invention.

FIG. 4 is a block diagram of a direction finder apparatus 400 according to the invention. The direction finder apparatus 400 includes an antenna system 403, a radio frequency (RF) front end 406, a signal detector 411, an analog-to-digital (A/D) converter 415, a Fourier transform (FFT) processor 422, a plurality of storage bins 428, and a post-processor 430.

The antenna system 403 picks up an electromagnetic signal. The antenna system 403 may be any type of antenna system that has a directional reception ability. The antenna system 403 may be a dish or parabolic antenna, an antenna array, or any other type of antenna or antenna grouping that produces a directional reception response. The directional reception ability refers to the ability of the antenna system 403 to be rotated or otherwise configured to provide a varying signal reception based on the orientation of the antenna system 403.

The RF front end 406 is connected to the antenna system 403 and receives RF electromagnetic signals from the antenna system 403. The RF front end includes at least one filter stage and at least one amplifier stage(not shown) in order to filter and amplify incoming signals, as is known in the art. For example, the RF front end 406 may be a crystal video receiver. In addition, the RF front end may be a high-temperature superconducting (HTS) front end that generates a very low amount of system noise.

The detector 411 is an analog envelope detector that detects an amplitude modulated characteristic signal imposed on a carrier wave (discussed below in conjunction with FIGS. 6 and 7). The detector 411 may be a diode, a heterodyne receiver, a video detector, etc.

The A/D converter 415 receives the characteristic signal and digitizes it. The A/D converter 415 may be any type of conventional A/D converter, such as a successive approximation A/D converter, a flash A/D converter, etc.

Because the signal is detected before it is digitized, the A/D converter bandwidth requirements are much less and the A/D converter 415 therefore does not have to be capable of a high sampling rate. For example, to sample a 80 Hz characteristic signal generated by a microwave oven, the A/D converter needs to be capable of sampling at a rate of only 160 Hz. However, a higher sampling rate could be used if it is desired to capture harmonics. In the prior art, to sample a 2.5 GHz signal, an A/D converter would need to sample at about a 5 GHz sampling rate.

In order to enable detection of a variety of signals, the RF bandwidth (the spectrum portion allowed in by the at least one filter stage) is very wide. The noise bandwidth (or effective noise bandwidth) is the bandwidth over which the radiant power produces a signal-to-noise ratio of unity. Therefore, in order to fully capture a signal, a receiver does not have to look at any frequencies outside of the noise bandwidth. The noise bandwidth may be mathematically represented by the equation:

$$BW = \text{sqrt}(2B_{RF}B_{FFT}) \tag{1}$$

where $B_{RF}$ is the RF bandwidth of the detected signal, and $B_{FFT}$ is the storage bin size of the FFT result (in Hz). The storage bins are the storage locations used to store Fourier transform results over a predetermined frequency range, with all of the included storage bins covering the noise bandwidth of the detected signal. For a FFT bin size of 0.1 Hz, the resulting noise bandwidth is sqrt(2*75 MHz*0.1), or 2,739 Hz. The A/D converter 415 according to the invention therefore requires only about a 3 kHz noise bandwidth for a target signal of about 2.45 GHz. This is about a six orders-of-magnitude difference between the RF bandwidth and the noise bandwidth. This equates to an increased detection range and direction finding accuracy.

The FFT processor 422 performs a Fourier transform on the digitized signal, as is known in the art. The FFT output may be averaged to smooth out the noise floor and to increase the quality of the pulse train signature. For situations that require an increase in detection range (or equivalently, direction finding accuracy), the FFT bin size may be reduced. This is the same as increasing the FFT dwell time or sample period, since they are reciprocal parameters of detection range/accuracy. For example, a 0.1 Hz FFT bin size implies a 10 second FFT dwell time.

The output of the FFT processor 422 is stored in the plurality of storage bins 428. A storage bin 428 may be a random access memory (RAM) cell, or alternatively may be any type of magnetic, optical, or bubble memory. Each storage bin 428 may store a FFT output corresponding to a time slice of a predetermined sample period. The direction finder apparatus 400 may employ any number of storage bins 428. The number may be chosen according to the desired result accuracy and cost space limitations of the direction finder hardware. The number of storage bins 428 may therefore be chosen to accommodate a predetermined number of sample periods.

The post-processor 430 communicates with the plurality of storage bins 428 and generates an output based on the plurality of Fourier transform results stored therein. The post-processor 430 may generate a signal amplitude output when an FFT result exceeds a noise threshold. The noise threshold may be a predetermined threshold that signifies that any FFT output below the threshold is considered to be noise, while any output equal to or above the threshold is considered to be a signal of interest. The output may be used to determine a DOA angle for locating the transmission source origin.

The direction finder apparatus 400 may be used to seek a maximum or peak FFT value. The antenna system 403 may be rotated or otherwise configured and the DOA angle may be determined to be the direction that produces the maximum signal output from the direction finder apparatus 400.

Figure 5:
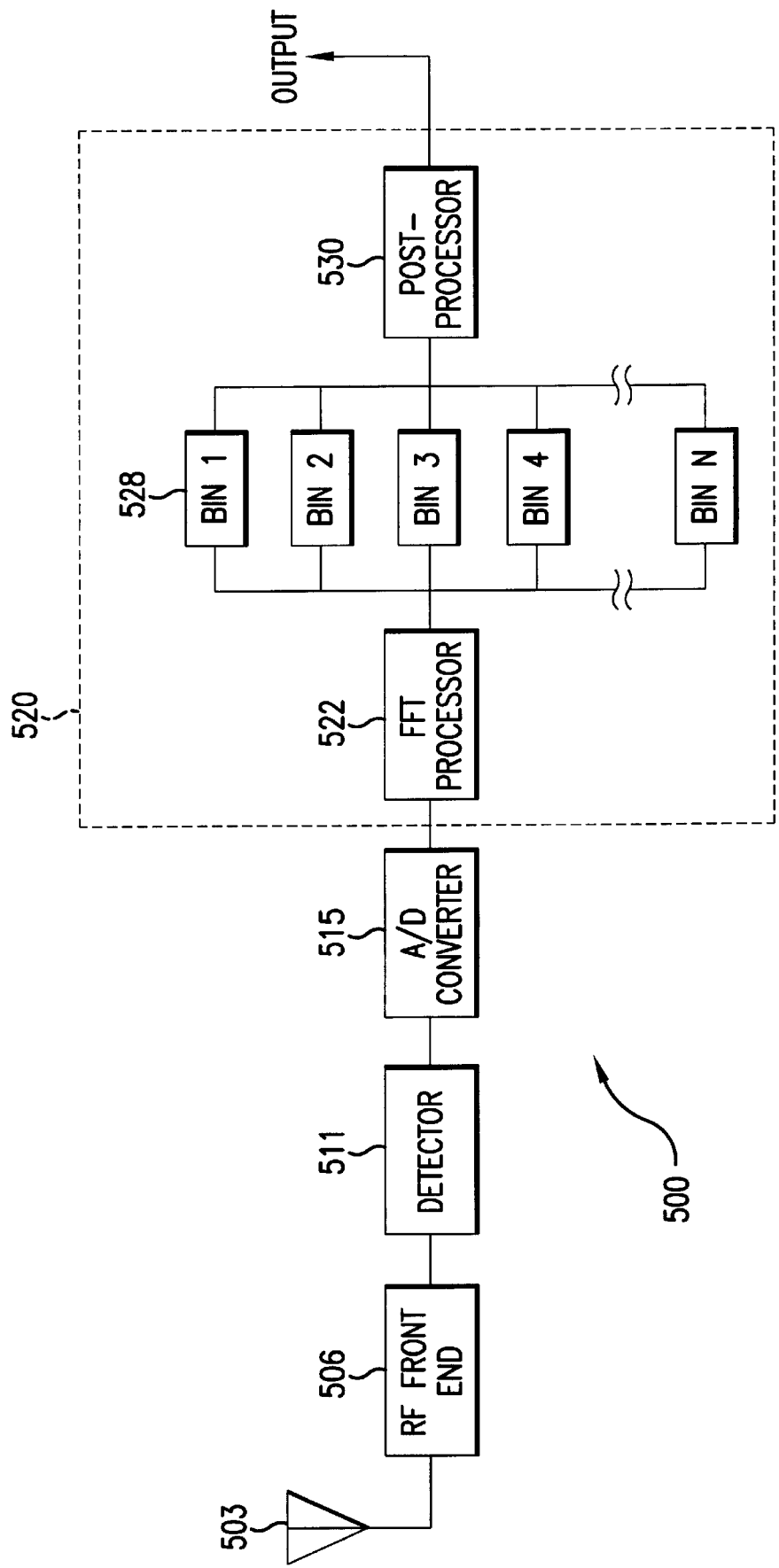
FIG. 5 is a block diagram of an alternative embodiment.

FIG. 5 is a block diagram of an alternative embodiment. In this embodiment, the FFT processor 522, the storage bins 528, and the post-processor 530 components are all included on a digital signal processor (DSP) chip 520.

Figure 6:
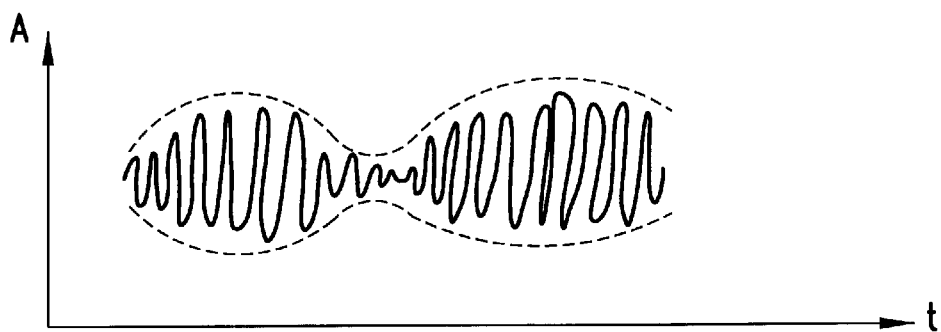
FIG. 6 shows a typical RF amplitude modulated signal produced by a microwave oven.

FIG. 6 shows a typical RF amplitude modulated signal produced by a microwave oven. The signal may be an AM pulse train of about 60 Hz, produced by the activation (flipping) of the magnetron about 60 times per second. Because the magnetron generates RF waves of about 2.5 GHz, each pulse is composed of a plurality of RF microwaves. According to the invention, it is much easier to detect the amplitude modulation imposed on the microwaves than to detect the microwaves.

Figure 7:
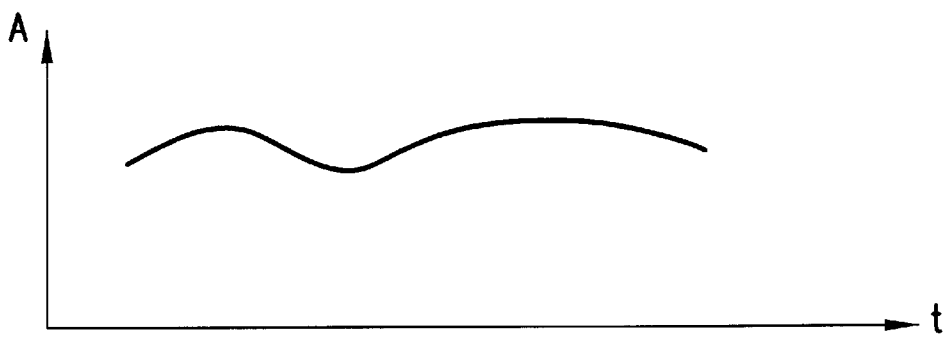
FIG. 7 shows the superimposed signal removed from the carrier wave.

FIG. 7 shows the superimposed characteristic signal removed from the carrier wave. The removal may be performed by a detector that removes the underlying carrier wave and leaves only the characteristic signal. The characteristic signal is still in the time domain.

Figure 8:
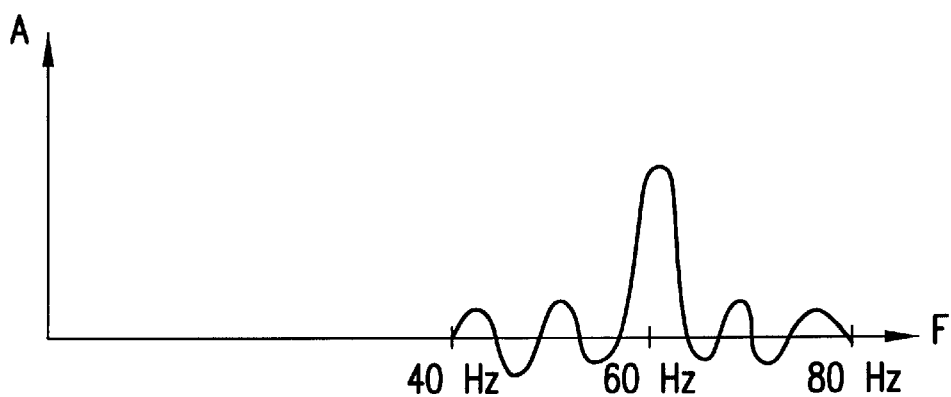
FIG. 8 shows the signal after it has been converted into the frequency domain.

FIG. 8 shows the characteristic signal after it has been converted into the frequency domain. The main frequency component will likely be centered at about 60 Hz. The amplitude modulated signal component, such as a microwave oven signature, is therefore much easier to detect in the frequency domain, and the noise bandwidth of the direction finder apparatus 400 and 500 is much easier to detect according to the invention.

Figure 9:
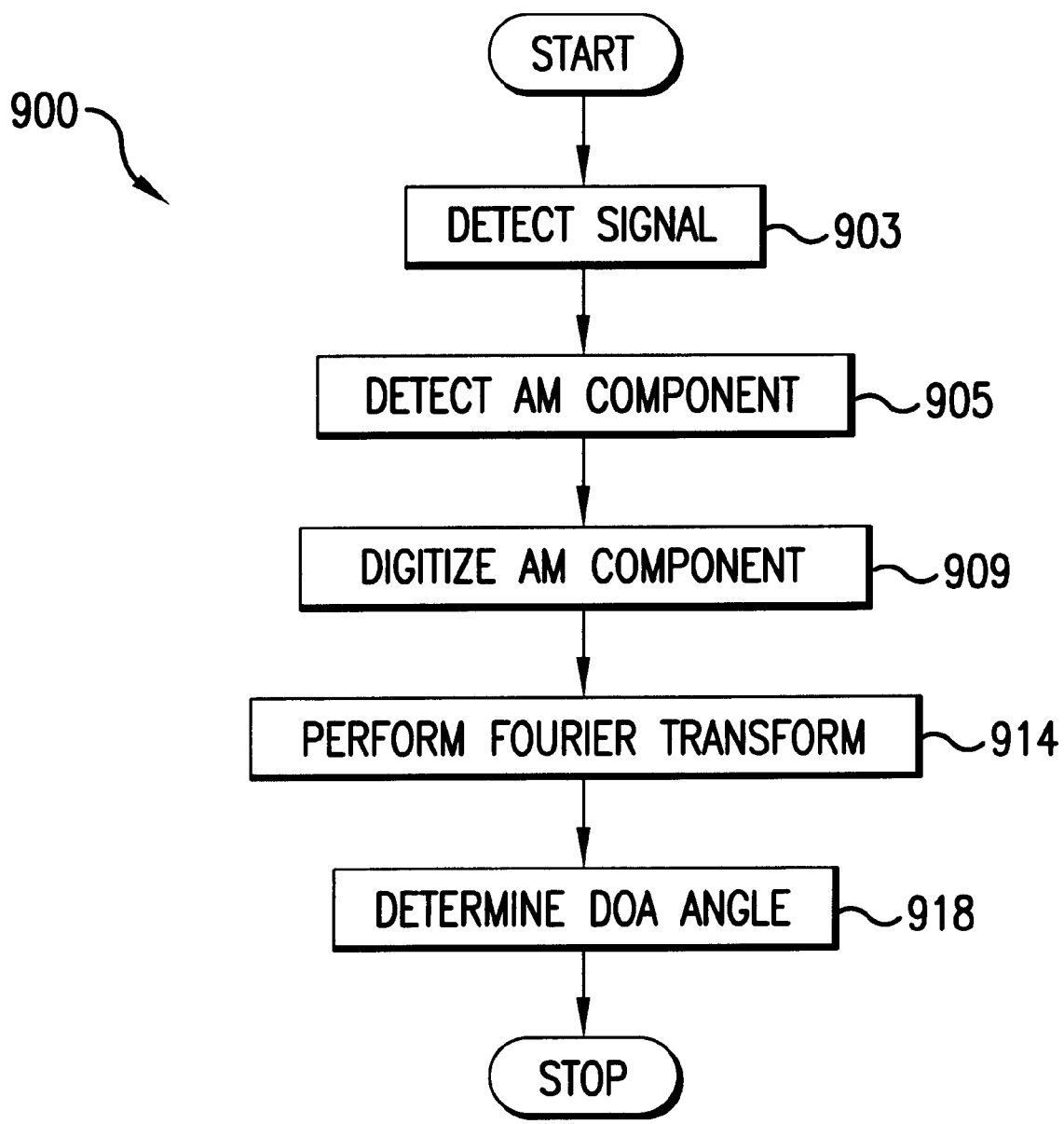
FIG. 9 is a flowchart of a method according to the invention.

FIG. 9 is a flowchart 900 of a method according to the invention. In step 903, a RF signal is detected. The RF signal includes an amplitude modulation component. The RF signal may be an intended transmission or it may be an unintended noise created by an electronic device. The detection is performed by a directional antenna system that may be rotated or otherwise configured to most strongly detect the RF signal when directed toward the RF signal source.

In step 905, the AM component of the RF signal is detected and the carrier wave component is removed by the detector, leaving the characteristic signal. The detection and carrier wave removal may be done in any manner known in the art. The AM signal detection (and carrier wave removal) may be performed by a diode, by a heterodyne mixer circuit, by a video detector, etc.

In step 909, the detected characteristic signal is digitized. This is preferably done by an A/D converter.

In step 914, a Fourier transform is performed on the digitized characteristic signal. The Fourier transform, such as a discrete fast Fourier transform, for example, transforms the digitized characteristic signal from the time domain to the frequency domain. The signal is much easier to process in the frequency domain, generally providing a peak at the largest frequency component of the digitized signal.

In step 918, the DOA angle is determined. The DOA angle is determined as being the antenna system orientation that produces a maximum direction finder apparatus output. The DOA angle to a RF signal may therefore be found by changing the antenna system orientation until a maximum FFT output is found. The FFT output must exceed a predetermined noise threshold, however, to qualify as a remote signal and not merely a naturally occurring noise floor. The method therefore may optionally include the steps of comparing a FFT output to a predetermined noise threshold value and treating the RF signal as noise if the FFT output is less than the predetermined noise threshold and treating the RF signal as a target signal otherwise.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A direction finder apparatus for determining a direction to a device generating a radio frequency (RF) signal that includes an amplitude modulated (AM) component, comprising:

an antenna system capable of receiving said signal;

a RF front end communicating with said antenna system, said RF front end including at least one filter stage and at least one amplifier stage;

an analog signal detector communicating with said RF front end and detecting said electromagnetic signal and providing in response a characteristic signal without an underlying carrier wave;

an analog-to-digital (A/D) converter communicating with said analog signal detector and digitizing said characteristic signal;

a fast Fourier Transform (FFT) processor communicating with said A/D converter and performing a Fourier transform on said digitized signal over a predetermined sampling period, said FFT processor producing a plurality of component frequency approximations representing frequency components of said AM signal;

a plurality of storage bins communicating with said FFT processor and storing said plurality of component frequency approximations; and a post-processor communicating with said plurality of storage bins, said post-processor determining a maximum S/N ratio from among said plurality of component frequency approximations;

wherein a direction of arrival (DOA) angle of said RF signal is determined when said antenna system is oriented to produce a maximum S/N ratio.

2. The direction finder apparatus of claim 1, wherein said RF front end is a crystal video receiver.

3. The direction finder apparatus of claim 1, wherein said RF front end is a high-temperature superconducting (HTS) front end.

4. The direction finder apparatus of claim 1, wherein said RF front end includes at least one amplifier stage and at least one filter stage.

5. The direction finder apparatus of claim 1, wherein said analog signal detector is a video detector.

6. The direction finder apparatus of claim 1, wherein said analog signal detector is a diode.

7. The direction finder apparatus of claim 1, wherein said analog signal detector is a heterodyne receiver.

8. The direction finder apparatus of claim 1, wherein said direction finder apparatus detects an AM envelope variation in said RF signal.

9. The direction finder apparatus of claim 1, wherein said FFT processor, said plurality of storage bins, and said post-processor are formed on a digital signal processor (DSP) chip.

10. a direction finder apparatus for determining a direction to a device generating a RF signal that includes an amplitude modulated (AM) component, comprising:

an antenna means for receiving said RF signal;

at least one filtering means for filtering said RF signal;

at least one amplifying means for amplifying said RF signal;

an analog signal detector means for detecting said electromagnetic signal and providing in response a characteristic signal without an underlying carrier wave;

an A/D converter means for digitizing said characteristic signal;

a FFT processing means for performing a Fourier transform on said digitized signal over a predetermined sampling period and producing a plurality of component frequency approximations representing frequency components of said AM signal;

a storage means for storing said plurality of component frequency approximations; and a post-processing means for determining a maximum S/N ratio from among said plurality of component frequency approximations;

wherein a direction of arrival (DOA) angle of said RF signal is determined when said antenna means is oriented to produce a maximum S/N ratio.

11. The direction finder apparatus of claim 10, wherein said direction finder apparatus detects an AM envelope variation in said RF signal.

12. The direction finder apparatus of claim 10, wherein said FFT processor means, said plurality of storage bin means, and said post-processor means are included as part of a digital signal processor (DSP) means.

13. A method of finding a direction to a source of an RF signal that includes an amplitude modulated component, comprising the steps of:

detecting said RF signal;

detecting said amplitude modulated component;

digitizing said amplitude modulated component;

performing a Fourier transform on said digitized amplitude modulated component to produce a FFT output; and determining a direction of arrival angle from a maximum FFT output.

14. The method of claim 13, wherein said detecting of said RF signal is performed by an antenna system and a RF front end.

15. The method of claim 13, wherein said detecting of said amplitude modulated component is performed by an analog envelope follower.

16. The method of claim 13, wherein said detecting of said amplitude modulated component detects an AM envelope variation in said RF signal.

17. The method of claim 13, wherein said step of determining said direction of arrival angle further comprises the steps of:

comparing a FFT output to a predetermined noise threshold value; and treating said RF signal as noise if said FFT output is less than said predetermined noise threshold and treating said RF signal as a target signal otherwise.

18. The method of claim 13, wherein a direction of arrival angle is determined by rotating a directional antenna system until said FFT output is a maximum.

* * * * *